United States Patent [19]

Kasuga et al.

[11] Patent Number: 4,471,381
[45] Date of Patent: Sep. 11, 1984

[54] SYSTEM FOR CONVERTING NUMBER OF SCANNING LINES

[75] Inventors: Masao Kasuga, Sagamihara; Nobuaki Takahashi, Yamato; Takeshi Shibamoto, Sagamihara, all of Japan

[73] Assignee: Victor Company of Japan, Limited, Yokohama, Japan

[21] Appl. No.: 357,132

[22] Filed: Mar. 11, 1982

[30] Foreign Application Priority Data

Mar. 12, 1981 [JP] Japan .................................. 56-35573

[51] Int. Cl.$^3$ .............................................. H04N 5/02
[52] U.S. Cl. .................................................... 358/140
[58] Field of Search ......................................... 358/140

[56] References Cited

U.S. PATENT DOCUMENTS

| 3,830,971 | 8/1974 | van de Polder | 358/140 |
| 3,970,776 | 7/1976 | Kinuhata et al. | 358/140 |
| 4,125,862 | 11/1978 | Catano | |
| 4,240,101 | 12/1980 | Michael | 358/140 |

FOREIGN PATENT DOCUMENTS

| 2617884 | 11/1977 | Fed. Rep. of Germany | |
| 1326386 | 8/1973 | United Kingdom | 358/140 |
| 2,031,687 | 4/1980 | United Kingdom | 358/140 |
| 2097219 | 10/1982 | United Kingdom | 358/140 |

OTHER PUBLICATIONS

*The Royal Television Society Journal,* London, vol. 15, No. 5, Sep.-Oct., 1974, pp. 140-142, 145-146, 149-150, 155, 156, 159.

*International Broadcasting Convention,* London, IEE, 23-27, Sep., 1974, pp. 104-113.

*Primary Examiner*—Howard W. Britton
*Attorney, Agent, or Firm*—Louis Bernat

[57] ABSTRACT

A system for converting number of scanning lines converts a first number of scanning lines of a first digital video signal into a second number of scanning lines of a second digital video signal. The system comprises a discrete signal obtaining circuit supplied with the first digital video signal, for successively re-arranging a plurality of picture element information arranged along lines in a vertical direction with respect to a picture frame indicated by the first digital video signal within a time interval corresponding to the first number of scanning lines in units of each of the lines in the vertical direction in a time series manner, to obtain a discrete signal having a sampling frequency equal to a horizontal scanning frequency of the first digital video signal, a sampling frequency converter for converting the sampling frequency of the discrete signal obtained from the discrete signal obtaining circuit into a frequency equal to a horizontal scanning frequency of the second digital video signal, and a second video signal obtaining circuit for successively re-arranging an output of the sampling frequency converter in units of a plurality of picture element information along a direction of horizontal scanning lines in accordance with the second digital video signal in a time series manner, to obtain the second digital video signal using the second number of scanning lines.

13 Claims, 8 Drawing Figures

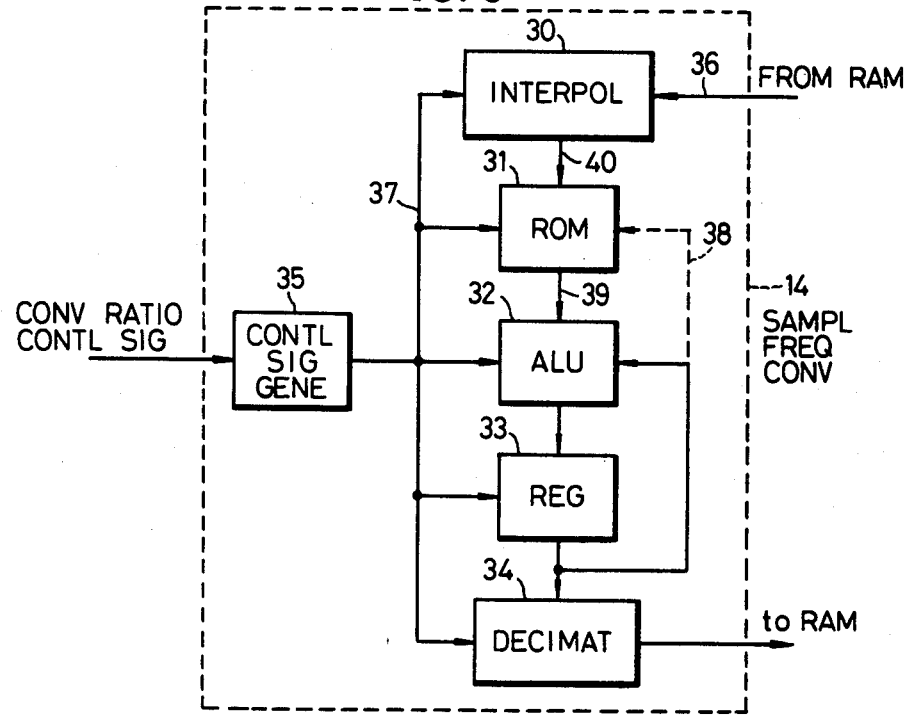
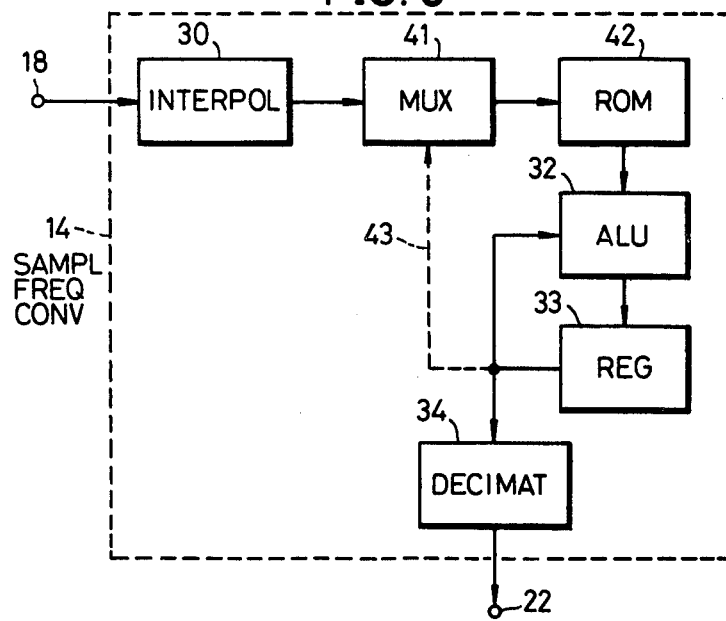

SYSTEM FOR CONVERTING NUMBER OF SCANNING LINES

BACKGROUND OF THE INVENTION

The present invention generally relates to systems for converting a number of scanning lines, and more particularly to a system in which the sampling frequency of a discrete signal sequence related to a plurality of picture elements arranged along a vertical direction with respect to a picture frame is converted into a predetermined frequency, to convert a video signal of a first television system into a video signal of a second television system which uses a number of scanning lines which are different from those used in the first television system.

As is well known, a picture frame of a television receiver and the like is formed as an electron beam scans horizontally from the left to right, for example, with the horizontal scan being performed vertically from the upper part to the lower part of the picture frame. An information regarding the horizontal scanning line can be considered as a time-sequential signal of a discrete information regarding picture elements on the horizontal scanning line. Accordingly, the picture frame can be considered as being formed from a plurality of picture elements arranged in a matrix form. That is, the picture frame can be considered as being constructed from a two-dimensional discrete information obtained by a discrete signal sequence of a time interval (a predetermined sampling period) corresponding to intervals between adjacent picture elements along the horizontal scanning direction.

The television system is not unified throughout the world. With respect to the number of scanning lines in a frame of the video signal, there are television systems (such as the NTSC system) using 525 scanning lines, television systems (such as the PAL system and the SECAM system) using 625 scanning lines, and the like. Hence, as well known, if a digital video signal which is a discrete signal sequence of the above described predetermined sampling frequency is to be reproduced by a television receiver of a different television system, it becomes necessary to perform a television system conversion. For example, there was a conventional apparatus for converting a digital video signal of a television system using 625 scanning lines in a frame, into a digital video signal of a television system using 525 scanning lines in a frame. In this conventional apparatus, decimation was performed to discard 4 scanning lines in every 25 scanning lines, in order to convert the number of scanning lines to 525 from 625.

However, in the above conventional apparatus, in a case where the above described system conversion is performed to convert the number of scanning lines to 525 from 625 when the digital video signal indicates an inclined line in the picture frame, for example, the inclined line in the picture frame became partially discontinuous after the system conversion. Moreover, since the above decimation is performed with respect to the horizontal scanning lines, there was a disadvantage in that degradation was introduced in the vertical resolution.

As another conventional apparatus for converting the number of scanning lines, there was an apparatus which performed the system conversion by considering the video signal as a space transfer function f(x, y) having space frequencies x and y, by using Hadamard's conversion. However, sufficient research has not been made in this field. Further, since this method optimizes approximate values, there were various disadvantages in that the apparatus required a considerably large hardware the time required for the calculation was extremely long, and uncertainty was introduced in the data obtained.

Another method may be considered in which a discrete sequential input related to the picture elements of a first television system is converted into a discrete sequential output related to the picture elements of a second television system. For example, when obtaining a picture element $g(x_{n1}, y_{n2})$, the following equations (1) or (2) stands if the input signal is designated by $f(x, y)$.

$$g(x_{n1}, y_{n2}) = \sum_{k1=0}^{M1} \sum_{k2=0}^{M2} a_{k1\,k2} \cdot f\{(n1 - k1), (n2 - k2)T1\} \quad (1)$$

$$g(x_{n1}, y_{n2}) = \sum_{k1=0}^{M1} \sum_{k2=0}^{M2} a_{k1\,k2} \cdot f\{(n1 - k1), (n2 - k2)T2\} - \quad (2)$$

$$\sum_{k1=0}^{N1} \sum_{k2=0}^{N2} b_{k1\,k2} \cdot g\{(n1 - k1), (n2 - k2)T2\}$$

In the above equations (1) and (2), T1 indicates the sampling period of the input along a horizontal axis, and T2 indicates the sampling period of the output along the horizontal axis. The sampling points (picture elements) of the output are thus determined by the picture elements of the input, by use of the equation (1) or (2). However, it can be seen from the above equations that the calculation will become extremely complex, and as a result, uncertainties are introduced in the results obtained. That is, because of the complexity involved in calculating the above equations, there is a disadvantage in that the circuit construction will become complex and that errors will inevitably be introduced during the complex calculation.

SUMMARY OF THE INVENTION

Accordingly, it is a general object of the present invention to provide a novel and useful system for converting number of scanning lines, in which the above described disadvantages have been overcome.

Another and more specific object of the present invention is to provide a system for converting the number of scanning lines, in which the sampling frequency of a discrete signal sequence related to a plurality of picture elements arranged along a vertical direction with respect to a picture frame is converted into a predetermined frequency, in order to convert a video signal of a first television system into a video signal of a second television system which uses a number of scanning lines different from that used in the first television system.

Other objects and features of the present invention will be apparent from the following detailed description when read in conjunction with the accompanying drawings.

BRIEF DESCRIPTION OF THE DRAWINGS

FIG. 6 is a systematic block diagram showing another embodiment of the essential part of the system according to the present invention;

FIG. 8 is a systematic block diagram showing still another embodiment of the essential part of the system according to the present invention.

DETAILED DESCRIPTION

Figure 1:
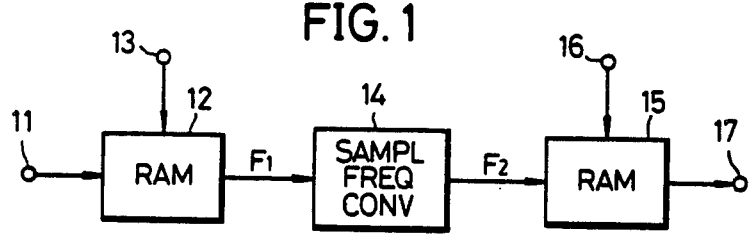
FIG. 1 is a systematic block diagram showing an embodiment of a system for converting number of scanning lines according to the present invention.

An embodiment of a system for converting a number of scanning lines according to the present invention, is shown in FIG. 1. In the system according to the present invention, a digital video signal is processed as a one-dimensional time-sequential signal, upon conversion of the number of scanning lines. In FIG. 1, a digital video signal L1 whose number of scanning lines is to be converted, is applied to a digital video signal input terminal 11. The digital video signal is then supplied to a random access memory (RAM) 12. The above digital video signal is successively written into this RAM 12, under the control of a write-in control signal obtained through a terminal 13. The input digital video signal L1 is a discrete signal sequence of a sampling period indicated by T1 in FIG. 2, for example, and is defined by the following equation (3).

$$L1 | f(x, y) \quad (3)$$

Figure 2:
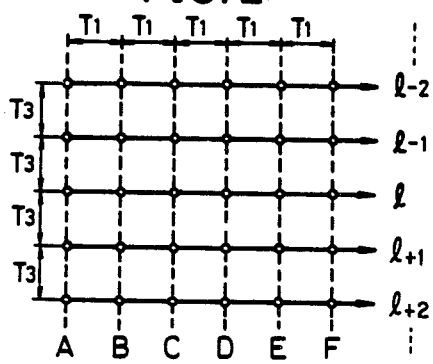
FIG. 2 shows an arrangement of picture elements in a picture frame formed by a digital video signal.

In FIG. 2, picture elements in the picture frame are respectively indicated by small circles, and the horizontal scanning is performed towards the direction indicated by arrows. 1−2 through 1+2 indicated at the right hand side in FIG. 2 respectively indicate the (1−2)-th through (1+2)-th horizontal scanning lines.

The above equation (3) can be described as the following time series signal.

$$L1 = \sum_{i=1}^{K} \sum_{j=1}^{J} f(x_i, y_j) \quad (4)$$

In the above equation (4), K represents the total number of picture elements in one horizontal scanning line, and J represents the number of scanning lines in one frame of the video signal. One picture element is indicated by M (M is an integer) bits.

Since the picture elements in one picture frame are mutually independent the following equation (5) stands, where $g(x_i)$ indicates a line consisting of i (i is an integer) picture elements.

$$L1 = \sum_{i=1}^{K} g(x_i) \quad (5)$$

where $$g(x_i) = \sum_{j=1}^{J} f(x_i, y_j) \quad (6)$$

It can be seen that L1 is a linear combination of the function $g(x_i)$, from the above equation (5).

$$g(x_i) \epsilon L1 \quad (7)$$

That is, $g(x_i)$ is an element of L1. Therefore, when the function $g(x_i)$ is processed in a certain manner, this may be considered as being equivalent to processing L1 in that certain manner. Accordingly, when a process is performed with respect to the function $g(x_i)$, this can be considered equivalent to the case where the processing is performed with respect to the above equation (3).

Next, the above function $g(x_i)$ is re-written according to the equation (6), in the form of the following equation (8).

$$g(x_i) = \{y_j\}_{x_i}^{j=1,J} \quad (8)$$

In the above equation (8), $x_i$ is a time-sequential discrete signal. If it is assumed that the input signal applied according to the equation (8) is a time-sequential discrete signal, time intervals of the time-sequential discrete signal can be indicated by T3 in FIG. 2. That is, the digital video signal written into the RAM 12 is read out under the control by an input read-out signal obtained from the terminal 13, as a time-sequential discrete signal of a sampling period T3 related to picture element information of a plurality of (J) picture elements arranged along the vertical direction of the picture frame. This time-sequential discrete signal thus read out from the RAM 12, is applied to a sampling frequency converter 14.

The above time-sequential discrete signal applied to the sampling frequency converter 14 is a time-sequential signal in which J picture information arranged along the vertical direction indicated by A in FIG. 2 are first obtained, J picture information arranged along the vertical direction indicated by B are secondly obtained, and the picture information arranged along the vertical direction indicated by C, D, E, and F are successively obtained in a similar manner, for example. The sampling frequency F1 of this time-sequential discrete signal is equal to the horizontal scanning frequency of the input digital video signal. That is, the following equation (9) stands.

$$F1 = 1/T3 \quad (9)$$

Figure 3:
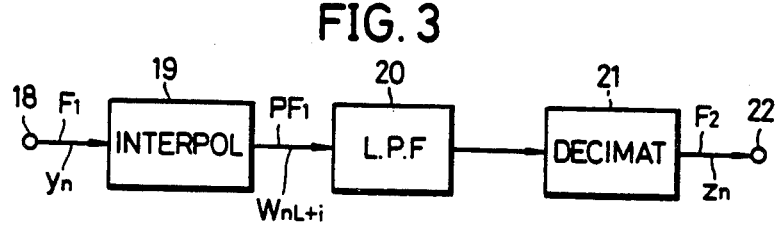
FIG. 3 is a systematic block diagram showing an embodiment of an essential part of the system according to the present invention.

The sampling frequency converter 14 has a construction shown shown in FIG. 3. The sampling frequency converter 14 converts the above sampling frequency F1 into a sampling frequency F2. The frequency F2 can be considered as being the inverse of the time interval T4 between adjacent horizontal scanning lines of a television system using the desired number of scanning lines. Therefore, the following equation (10) can be formed.

$$F2 = 1/T4 \quad (10)$$

In FIG. 3, a time-sequential discrete signal $y_n$ of the sampling frequency F1 obtained from the RAM 12, is applied to an input terminal 18. The signal $y_n$ is then supplied to an interpolator 19 wherein (P−1) zeros (P is an integer) are inserted between each discrete value to equivalently obtain a continuous signal. The following equation (11) stands where P and Q are integers.

$$P = Q(F2/F1) \quad (11)$$

Hence, if F1 is the sampling frequency of the digital video signal having 625 scanning lines, and F2 is the sampling frequency of digital video signal having the desired 525 scanning lines P=21 and Q=25.

Accordingly, if an output signal of the interpolator 19 is designated by $w_{nL+i}$, the following equation (12) stands.

$$w_{nL+i} = \begin{cases} y_n \ (i = 0) \\ 0 \ (i = 1, 2, \ldots, P = 1) \end{cases} \quad (12)$$

Figure 4:
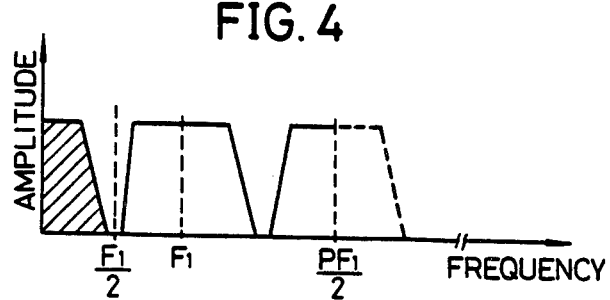
FIG. 4 shows a frequency spectrum of an output signal from a part of the block system shown in FIG. 3.

The frequency spectrum of the signal $w_{nL+i}$ is shown in FIG. 4. In FIG. 4, the fundamental band of the input discrete signal $y_n$ is indicated by sloping lines, and the frequency spectrum of the signal $w_{nL+i}$ is distributed up to a frequency $PF\frac{1}{2}$ (the part indicated by the solid line in FIG. 4) with the above fundamental band folded. Since the sampling frequency of the signal $y_n$ is F1, the fundamental base w becomes $0 \leq w < F\frac{1}{2}$.

The signal $w_{nL+i}$ is obtained through a decimation device 21 provided at a succeeding stage as a time series discrete signal sampled at the frequency F2. However, as shown in FIG. 4, the frequency components other than the fundamental band of the signal $y_n$ may become folded and mixed into the output signal. Hence, the frequency components other than the fundamental band of the signal $y_n$ are eliminated by a lowpass filter 20 shown in FIG. 3. The decimation is thus performed at the decimation device with respect to the output of the lowpass filter 20. The signal-to-noise (S/N) ratio is determined by the attenuation quantity of the lowpass filter 20.

The decimation device 21 samples every Q-th output of the lowpass filter 20. Accordingly, as clearly seen from the above equation (11), a discrete signal $z_n$ having a sampling frequency PF1/Q, that is, F2, is obtained from the decimation device 21, and produced through an output terminal 22. For example, the sampling frequency F2 of the output discrete signal $z_n$ from the output terminal 22 corresponds to the horizontal scanning frequency of the digital video signal of the television system using the desired 525 scanning lines for one frame of the video signal. Moreover, the signal $z_n$ is a signal in which the picture element information along the vertical direction of the picture frame is composed time-sequentially. The signal $z_n$ is applied to a RAM 15 shown in FIG. 1 through the output terminal 22, and written into the RAM 15 under the control of a write-in control signal obtained through a terminal 16.

The discrete signal $z_n$ thus written into the RAM 15 is then re-arranged in units of picture element information along the horizontal direction of the picture frame, and successively read out under the control of a read-out control signal obtaained through a terminal 16. The signal thus read out is produced through an output terminal 17. Accordingly, a discrete signal in which the picture element information along the horizontal scanning direction is successively composed in a time-sequentially manner, is obtained from the output terminal 17. This discrete signal thus obtained, is a digital video signal of a television system which uses 525 scanning lines for one frame, for example.

As described above, the frequency F1 which is considered as being equal to the horizontal scanning frequency of the first television system, is converted into the frequency F2 which is considered as being equal to the horizontal scanning frequency of the second television system, by use of the sampling frequency converter 14. And, the number of scanning lines in the first television system is converted into the number of scanning lines in the second television system. However, if the order of the lowpass filter 20 is designated by N (N is an integer), and the impulse response is designated by $h_m$, the output discrete signal $z_n$ obtained from the output terminal 22 can be described by the following equation (13).

$$z_n = \sum_{m=0}^{N-1} h_m \cdot w_{n-m} \quad (13)$$

As clearly seen from the above equation (13), the discrete signal $z_n$ is determined by the characteristic of the lowpass filter 20. Accordingly, when designing the lowpass filter 20, it is desirable to design a filter which does not have folding distortion and delay distortion, and which has a simple construction.

The sampling frequencies F1 and F2 may be a frequency which is an integer multiple of the horizontal scanning frequency of a predetermined television system, or a frequency obtained by dividing the horizontal scanning frequency of the predetermined television system by an integer. One skilled in the art would naturally turn to these frequency relationships in order to perform the desired conversion, with respect to the number of scanning lines.

When the lowpass filter 20 is constructed from digital filters, the construction disclosed in a U.S. patent application Ser. No. 311,095 filed Oct. 13, 1981 entitled "Sampling Frequency Converter" can employed in which the assignee is the same as that of the present application. That is, the digital filter may be constructed from a finite impulse response (FIR) digital filter and an infinite impulse response (IIR) digital filter connected in series. By use of this construction, the order of the filter can be reduced, and the generation rate of errors and the time required for performing mathematical operations can be greatly reduced.

If the picture frame of the digital video signal obtained after the conversion of the number of scanning lines is performed is designated by L2, the above described operation of the RAM 15 can be described mathematically by the following equation (14) in a similar manner as in the case of the above equation (5). In the equation (14), functions e and d respectively indicate a line consisting of the plurality of picture elements.

$$e(u_i, v_j) = \sum_{j=1}^{JJ} d(u_i, z_j) \quad (14)$$

In the above equation (14), JJ indicates the number of scanning lines for one frame of the video signal, and JJ is 525 in the above embodiment of the invention.

The picture frame L2 can thus be described in the form of the following equation (15).

$$L2 = \sum_{i=1}^{K} \sum_{j=1}^{JJ} e(u_i, v_j) \quad (15)$$

Figure 5:
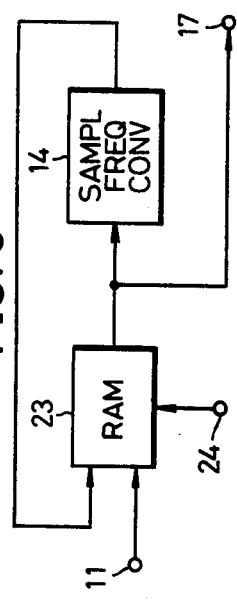
FIG. 5 is a systematic block diagram showing another embodiment of a system for converting number of scanning lines according to the present invention.

Next, description will be given with respect to a second embodiment of a system for converting number of scanning lines according to the present invention, by referring to FIG. 5. In FIG. 5, those parts which are the same as those corresponding parts in FIG. 1 are designated by the same reference numerals, and their description will be omitted. In FIG. 5, the digital video signal of the first television system is applied to the input terminal 11, and applied to a RAM 23. A signal processing operation is performed in a similar manner as in the case of the above described RAM 12. The discrete signal read out from the RAM 23, which is the same as the output of the RAM 12, is supplied to the sampling frequency converter 14. The sampling frequency F1 of the discrete signal is converted into the sampling frequency F2 in the sampling frequency converter 14 as described above. The output of the sampling frequency converter 14 is then written into the RAM 23. A read-out operation similar to that performed with respect to the RAM 15 is performed with respect to this RAM 23, under the control of a read-out control signal obtained through a terminal 24. The discrete signal thus read-out from the RAM 23 is produced through the output terminal 17. In the present embodiment of the invention, a single RAM 23 is used in order to reduce the number of circuit elements which are required.

Figure 7:
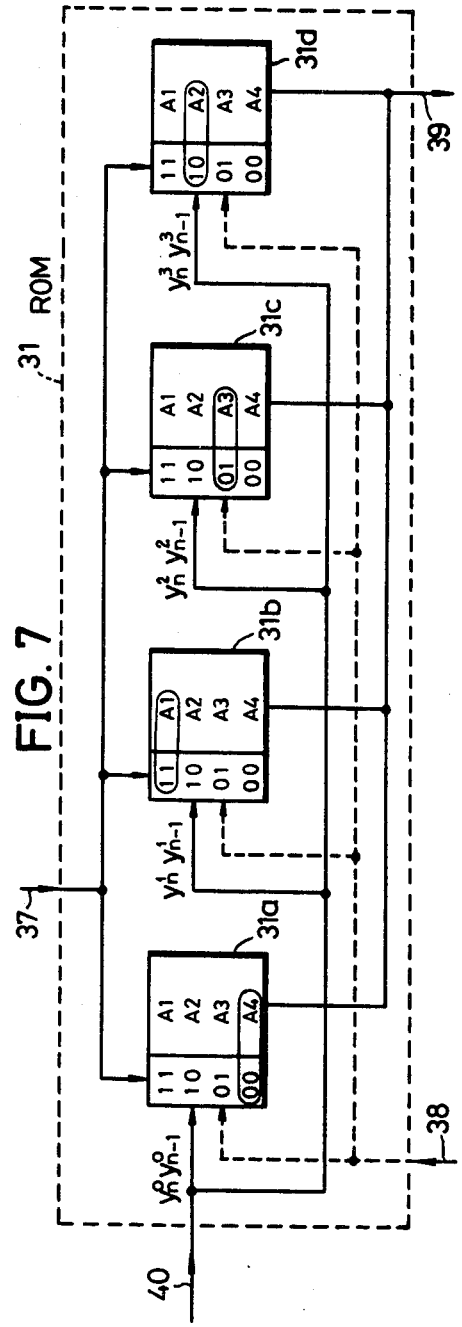
FIG. 7 is a circuit diagram showing a concrete embodiment of a part of the block system shown in FIG. 6.

Next, description will be given with respect to an embodiment of the above sampling frequency converter 14, by referring to FIG. 6. In FIG. 6, the signal $y_n$ from the RAM 12 (or 23) is supplied to an interpolator 30 through a bus 36. A read only memory (ROM) 31 in which multiplication results are stored, is accessed after the above signal $y_n$ is re-arranged in the order of each bit of the input signal. The interpolator 30 and a RAM 31 are connected by a bus 40. The ROM 31 has a construction shown in FIG. 7, for example. In FIG. 7, the ROM 31 consists of ROMs 31a through 31d, and the ROMs 31a through 31d each comprises an address part and a content part wherein multiplication results A1 through A4 are stored. The number of bits required for the address of the ROM 31, is determined by the number of input signals, that is, the order of the digital filter. Accordingly, in the present embodiment, two or three bits are required for the address of the ROM 31, and FIG. 7 shows an embodiment wherein the number of address bits is two. The number of ROMs required is determined by the number of bits of the signal, and in the present embodiment, the four ROMs 31a through 31d are provided since the signal has four bits.

Four kinds of addresses, that is, "11", "10", "01", and "00" can be provided in each address part within the ROMs 31a through 31d. Here, for example, the most significant bit (MSB) to the least significant bit (LSB) can be in the order "00", "11", "01", and "10" where "00" is the MSB and "10" is the LSB. Moreover, it is assumed that "00", "11", "01", and "10" respectively correspond to "$y^0_n y^0_{n-1}$", "$y^1_n y^1_{n-1}$", "$y^2_n y^2_{n-1}$", and "$y^3_n y^3_{n-1}$".

The results obtained by successively accessing the ROM 31, are supplied to an arithmetic logic unit (ALU) 32 through a bus 39, and added or subtracted in the ALU 32 and a register 33. When there are two inputs, a signal $z_n$ satisfying the equation $z_n = a_0 y_n + a_1 y_{n-1}$ is obtained. The signal $z_n$ thus obtained, is subjected to decimation at a decimation device 34. The decimation device 34 is controlled by a signal supplied from a control signal generator 35 which controls the above interpolator 30, the ROM 31, the ALU 32, and the register 33 through a bus 37. The control signal generator 35 is supplied with a signal indicating a conversion ratio between the first television system (using 625 scanning lines, for example) and the second television system (using 525 scanning lines, for example). The decimation device 34 thus produces the above signal $z_n$ with an interval according to the above conversion ratio control signal. The signal produced by the decimation device 34 is supplied to the RAM 15 (or 23).

When the signal $z_n$ can be described by the equation $z_n = a_0 y_n + a_1 y_{n-1} + b_1 z_{n-1}$, the term $z_{n-1}$ must be considered, and the connections (bus 38) indicated by dotted lines in FIGS. 6 and 7 become necessary.

The circuit for obtaining the signal $z_n$ which satisfies the equation $z_n = a_0 y_n + a_1 y_{n-1}$ or $z_n = a_0 y_n + a_1 y_{n-1} + z_{n-1}$ is either an FIR digital filter or an IIR digital filter.

Still another embodiment of the above sampling frequency converter 14 is shown in FIG. 8. In FIG. 8, those parts which are the same as those corresponding parts in FIGS. 3 and 6 are designated by the same reference numerals.

In FIG. 8, the signal $y_n$ from the RAM 12 (or 23) is supplied to the interpolator 30 through the terminal 18. In the present embodiment, unlike in the embodiment shown in FIG. 6, the output of the interpolator 30 is supplied to a single ROM 42 through a mutiplexer (MUX) 41. The ROM 42 is successively accessed through the MUX 41, in an order $y^0_n y^0_{n-1}$, $y^1_n y^1_{n-1}$, ..., for example. As in the above described embodiment shown in FIG. 6, the result obtained through the access of the ROM 42 is added or subtracted in the ALU 32 and the register 33. Accordingly, a signal $z_n$ is produced from the decimation device 34 and obtained through the terminal 22 as in the above described case. Description was given for a case where there are two inputs, that is, when the signal $z_n$ satisfies the equation $z_n = a_0 y_n + a_1 y_{n-1}$. However, even when the signal $z_n$ is described by the equation $z_n = a_0 y_n + a_1 y_{n-1} + b_1 z_{n-1}$, the signal $z_n$ can be calculated as in the above embodiment described in conjunction with FIGS. 6 and 7, by providing a connection 43 between the register 33 and the MUX 41. Morever, in the present embodiment, it is not necessary to provide the control signal generator since the ROM 42 is successively accessed.

In the embodiments described in conjunction with FIGS. 6, 7, and 8, the digital filter part was constructed from ROM, ALU, and register. However, the digital filter part may be constructed by using multiplying circuits, for example.

In each of the above described embodiments of the system according to the present invention, it was assumed that a relationship F1 < F2 existed between the sampling frequencies F1 and F2. However, when F1 > F2, it becomes necessary to eliminate frequency components over a frequency F2/2 at the lowpass filter 20. This is to eliminate the unwanted folding frequency components over the frequency F2/2 which are generated at the decimation device 21.

In addition, the sampling frequency converter 14 is not limited to those described above using the digital filter. For example, a method can be used in which a signal converted of its sampling frequency is obtained by passing the signal through a filter circuit after first converting the signal into an analog signal. Moreover, a method can be used in which a point is estimated by use of the Newton's interpolation equation or the Lagrange's interpolation equation. Furthermore, the signals may be extracted with a predetermined time interval according to the equation (4), since the equation (7) will still be satisfied in this case.

In the system according to the present invention, the sampling frequency of the discrete signal sequence related to a plurality of picture elements arranged in the vertical direction with respect to the picture frame, is converted by using the sampling frequency converter and the RAM, to convert the number of scanning lines in the video signal of the first television system into the number of scanning lines in the video signal of the second television system. Accordingly, the read-out operation from the RAM may be performed in terms of a frame or a field of the video signal.

Further, the present invention is not limited to these embodiments, but various variations and modifications may be made without departing from the scope of the present invention.

What is claimed is:

1. A system for converting a first number of scanning lines of a first digital video signal into a second number of scanning lines of a second digital video signal, each of said video signals having a plurality of picture elements, said system comprising:

discrete signal obtaining means responsive to said first digital video signal for successively and time-sequentially re-arranging a plurality of picture elements, said picture elements being initially arranged with a time interval corresponding to said first number of scanning lines along lines in a vertical direction with respect to a picture frame which is indicated by said first digital video signal, said picture elements being arranged in units of each of the lines in the vertical direction to obtain a discrete signal having a sampling frequency which is equal to $m_1F1$, where $m_1$ is a natural number or a reciprocal of a natural number;

sampling frequency converting means for converting the sampling frequency of the discrete signal from said discrete signal obtaining means into a frequency which is equal to $m_2F2$, where $m_2$ is a natural number or a reciprocal of a natural number, $m_2$ being independent of $m_1$; and video signal obtaining means for successively and time-sequentially re-arranging an output signal of said sampling frequency converting means into units of a plurality of picture elements which are arranged along a direction of the horizontal scanning lines, in accordance with said second digital video signal, to obtain said second digital video signal employing said second number of scanning lines.

2. A system as claimed in claim 1 in which said discrete signal obtaining means comprises first memory means supplied with first and second control signals, said first digital video signal is successively written into said first memory means in response to said first control signal, the plurality of picture elements which are arranged with the time interval corresponding to said first number of scanning lines along the lines in the vertical direction with respect to the picture frame which is indicated by said first digital video signal, are successively and time-sequentially re-arranged in the units of each of the lines in the vertical direction and read out from said first memory means in response to said second control signal as the discrete signal having the sampling frequency $m_1F1$, said second digital video signal obtaining means comprises second memory means supplied with third and fourth control signals, said discrete signal having the converted sampling frequency $m_2F2$ and produced from said sampling frequency converting means is successively written into said second memory means in response to said third control signal, and the discrete signal stored in said second memory means is successively and time-sequentially re-arranged in the units of a plurality of picture elements which are arranged along the direction of the horizontal scanning lines in accordance with said second digital video signal and read out from said second memory means in response to said fourth control signal as said second digital video signal employing said second number of scanning lines.

3. A system as claimed in claim 2 in which said first and second memory means respectively comprise a random access memory.

4. A system as claimed in claim 1 in which said discrete signal obtaining means and said second digital video signal obtaining means are constituted by a single memory means supplied with first, second, third, and fourth control signals, said first digital video signal is successively written into said memory means in response to said first control signal, the plurality of picture elements which are arranged with the time interval corresponding to said first number of scanning lines along the lines in the vertical direction with respect to the picture frame which is indicated by said first digital video signal, are successively and time-sequentially re-arranged in the units of each of the lines in the vertical direction and read out from said memory means in response to said second control signal as the discrete signal having the sampling frequency $m_1F1$, said discrete signal having the converted sampling frequency $m_2F2$ and produced from said sampling frequency converting means is successively written into said memory means in response to said third control signal, and the discrete signal stored in said memory means is successively and time-sequentially re-arranged in the units of a plurality of picture elements which are arranged along the direction of the horizontal scanning lines in accordance with said second digital video signal and read out from said memory means in response to said fourth control signal as said second digital video signal employing said second number of scanning lines.

5. A system as claimed in claim 4 in which said memory means comprises a random access memory.

6. A system as claimed in claim 1 in which said sampling frequency converting means comprises an interpolator supplied with the discrete signal which has the sampling frequency $m_1F1$ and which is received from said discrete signal obtaining means, a filter supplied with an output of said interpolator, and a decimation device supplied with an output of said filter, said decimation device producing said discrete signal having the converted sampling frequency $m_2F2$.

7. A system as claimed in claim 6 in which said interpolator inserts $(P-1)$ zeros ($P=Q(F2/F1)$, where P and Q are integers) between each discrete value, said filter eliminates frequency components over a fundamental band w ($0 \leq w < F\frac{1}{2}$), and said decimation device samples every Q-th signal from said filter to produce the discrete signal having the sampling frequency $m_2F2$.

8. A system as claimed in claim 6 in which said sampling frequency converting means further comprises a control signal generator supplied with a conversion ratio control signal which indicates the conversion ratio between said first and second digital video signals, said control signal generator generating control signals and controlling said interpolator, filter, and decimation device by the control signals.

9. A system as claimed in claim 8 in which said filter comprises a read only memory supplied with the output of said interpolator and into which multiplication results are pre-stored, an arithmetic logic unit supplied with an output of said read only memory, and a register supplied with an output of said arithmetic logic unit, said register producing and supplying a signal to said decimation device, said arithmetic logic unit and said register performing mathematical operations by using results obtained by making access to said read only memory to obtain the discrete signal.

10. A system as claimed in claim 9 in which said register supplies an output to said read only memory.

11. A system as claimed in claim 6 in which said filter comprises a multiplexer supplied with the output of said interpolator, a read only memory supplied with an output of said multiplexer and into which multiplication results are pre-stored, and arithmetic logic unit supplied with an output of said read only memory, and a register supplied with an output of said arithmetic logic unit, said register producing and supplying a signal to said decimation device, said arithmetic logic unit and said register performing mathematical operations by using results obtained by making access to said read only memory to obtain the discrete signal.

12. A system as claimed in claim 11 in which said register supplies an output to said multiplexer.

13. A system as claimed in claim 6 in which said filter comprises a multiplexer supplied with the output of said interpolator, and a circuit supplied with an output of said multiplexer, said circuit performing mathematical operations to produce and supply the discrete signal to said decimation device.

* * * * *